United States Patent [19] | [11] 4,336,544
Donald et al. | [45] Jun. 22, 1982

[54] METHOD AND APPARATUS FOR DROP-ON-DEMAND INK JET PRINTING

[75] Inventors: David K. Donald, Redwood City; Michael J. Lee; John L. Vaught, both of Palo Alto, all of Calif.

[73] Assignee: Hewlett-Packard Company, Palo Alto, Calif.

[21] Appl. No.: 179,206

[22] Filed: Aug. 18, 1980

[51] Int. Cl.$^{3}$ .............................................. G01D 15/18
[52] U.S. Cl. .................................. 346/1.1; 346/140 R
[58] Field of Search ................. 346/75, 140 R, 140 A, 346/1.1

[56] References Cited

U.S. PATENT DOCUMENTS 3,596,275 7/1971 Sweet ................................ 346/75 X
3,886,565 5/1975 Kojima ................................ 346/140
3,950,760 4/1976 Rauch et al. .................... 346/140 R

*Primary Examiner*—John Gonzales
*Attorney, Agent, or Firm*—David A. Boone

[57] ABSTRACT

A drop-on demand ink jet printer and a method of ink jet printing are disclosed which produce drops whose diameter have a ratio to the internal diameter of their print nozzles of 1:2 instead of the standard ratio of 2:1. This change in the basic ratio of drop diameter to print nozzle diameter is a result of the motion imparted to the print liquid by the actuation of the print nozzle. The print nozzle is cocked, released, and abruptly stopped to impart forward momentum to the print liquid near the orifice of the print nozzle. This momentum urges the liquid to be expelled from the print nozzle. Cutting the orifice of the print nozzle at an oblique angle to the run of the print nozzle creates a leading edge on the print nozzle which increases control of drop placement. The leading edge encourages formation of a single umbilicus of expelled print liquid from which a drop will be severed.

6 Claims, 8 Drawing Figures

METHOD AND APPARATUS FOR DROP-ON-DEMAND INK JET PRINTING

BACKGROUND OF THE INVENTION

The invention relates to non-impact print apparatus, especially to ink jet printers capable of producing drops of ink on demand.

Drop-on-demand printing is well known in the prior art. A typical problem associated with this art is breaking the surface tension of the printing liquid. Other problems are creating drops singly, and uniformly, and controlling the placement of the drops on a record member. Various solutions to each problem have been explored in the prior art.

Prior art drop printers overcome the surface tension of the printing liquid either by applying electrical or acoustical pulses near the surface of the liquid or by creating a momentary reduction in the volume of the print liquid reservoir which squeezed a proportionate volume of the print liquid out of the orifice of the printer. U.S. Pat. No. 3,596,275 entitled "Fluid Droplet Recorder" and issued to Richard G. Sweet on July 27, 1971, uses hydrostatic pressure near the orifice to force a stream of print liquid from its nozzle. Control of the electrical or acoustical pulses or of the change in volume provides control of the volume of the drop produced. Prior art drop-on-demand ink jet printers generally produce drops of print liquid having a diameter of 1.9 times the internal diameter of the print nozzle. Therefore, the ratio of the internal diameter of the print nozzle to the diameter of the drop has traditionally been 1:2.

Although control of drop volume is necessary in controlling drop uniformity, control of volume is not sufficient to control the number of drops produced. A common problem in prior art drop printing was production of more than one drop at a time. Solutions to the multiple drop problem attempted either to produce single drops or to deflect unwanted drops away from the record number. A technique for reduction in the number of unwanted drops was described in U.S. Pat. No. 3,840,750 entitled "Pulsed Droplet Ejecting System" and issued to Steven I. Zoltan on Oct. 8, 1974. The apparatus disclosed therein reduced the diameter of the orifice to the point that surface tension prevented the print liquid from emerging when the activation mechanism was quiet. Deflection of unwanted drops away from the record member was disclosed in U.S. Pat. No. 3,298,030 entitled "Electrically Operated Character Printer" issued to Arthur M. Lewis and A. D. Brown, Jr. on Jan. 10, 1967, by electrostatically charging the emerging droplets and using electrically charged plates to steer them, and in U.S. Pat. No. 3,416,153 entitled "Ink Jet Recorder" issued to Carl H. Hertz, et al. on Nov. 26, 1968, by propelling the ink jet through an opening in a shield for intercepting unwanted drops then onto the record member. These methods of droplet control were relatively complicated and expensive.

Prior art methods for controlling placement of drops on the record member were generally variations on electrostatic charging of the drops and steering of the charged drops using additional electrical sources.

SUMMARY OF THE INVENTION

In accordance with the preferred embodiment of the present invention, a conduit having a small cross-sectional area is used to convey print liquid from a fluid reservoir to an orifice. Capillary action and surface tension cause the print liquid to be pulled through the conduit to the orifice. Surface tension of the print liquid at the orifice prevents the print liquid from emerging from the orifice spontaneously. Momentum is transferred to the print liquid adjacent to the orifice by abruptly interrupting the travel of the conduit. This momentum overcomes the surface tension of the print liquid at the orifice forcing a drop of print liquid to emerge from said orifice. The travel of the conduit occurs in response to release of the conduit following displacement of said conduit. Electrical signals control the timing of both the displacement and release of the conduit. The amount of displacement of the conduit is determined to provide a selected velocity at the orifice of the conduit just prior to the interruption of travel of the conduit.

The orifice of the preferred embodiment is cut at an angle rather than being orthogonal to the run of the conduit adjacent to the orifice. Angling the face of the orifice creates a leading edge which the print liquid follows as momentum breaks the surface tension. The leading edge becomes the single point at the orifice where drops break free of the emerging umbilicus of print liquid, thereby creating a single point of drop exit and allowing control of placement of the dots on the record member.

DESCRIPTION OF THE PREFERRED EMBODIMENT

Figure 3:
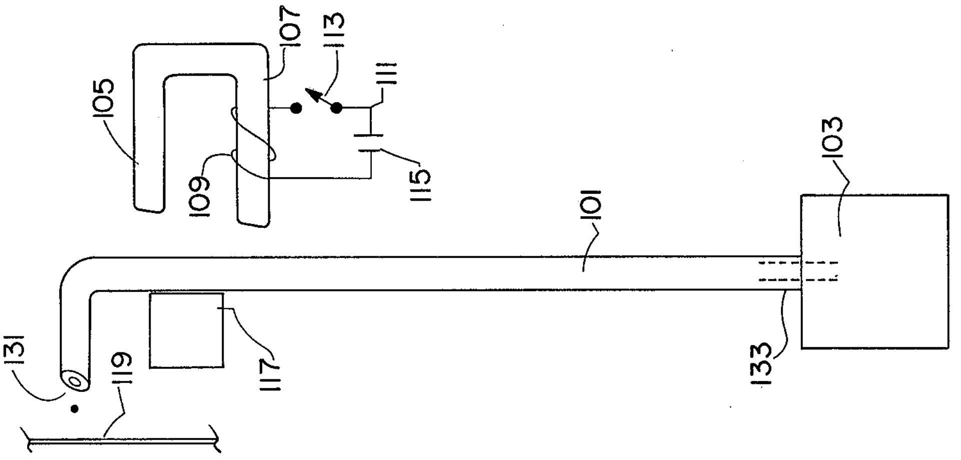
FIG. 3 illustrates the first preferred embodiment in the impact position which launches a drop of print liquid toward the record member.
Figure 2:
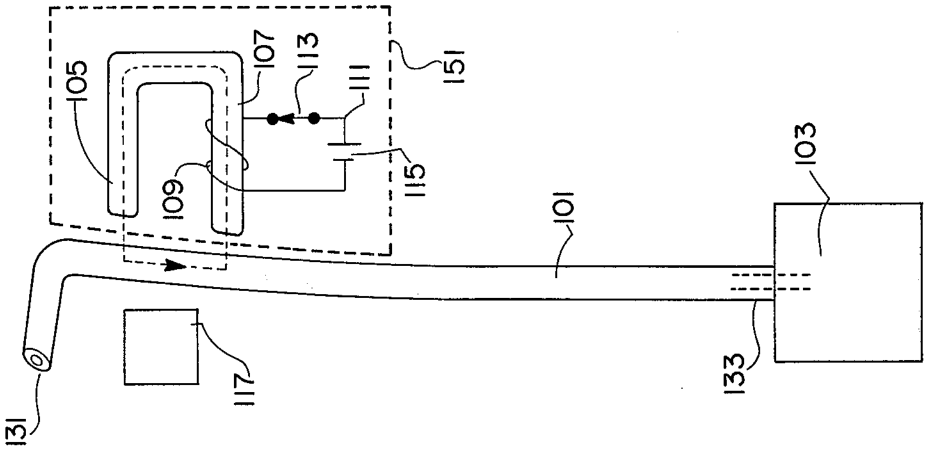
FIG. 2 illustrates the first preferred embodiment of the printer in the ready position.
Figure 1:
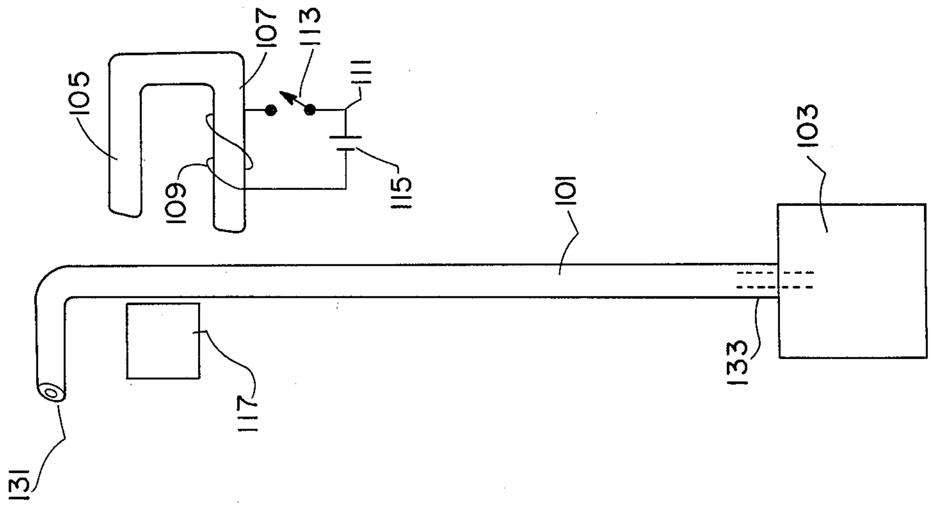
FIG. 1 illustrates the first preferred embodiment of the printer at rest.

The series of FIGS. 1, 2, and 3 illustrate the operation of the drop-on-demand ink jet printer. The printer includes a conduit 101 which has an orifice 131 and a base end 133 rigidly coupled to a reservoir 103, an actuator 151, and an anvil 117.

Actuator 151 is composed of two pole pieces 105 and 107 with a coil formed about second pole piece 107 by a wire 111 having a switch 113 and a capacitor 115 on the wire. The electro-magnetic actuator formed by the above commbination of elements activates upon closure of switch 113 to form a magnetic field.

FIG. 1 illustrates the rest position of the printer. With switch 113 open, the pole pieces and coil produce no magnetic field. With switch 113 closed, as illustrated in FIG. 2, pole pieces 105 and 107 carry a magnetic field. This magnetic field distorts conduit 101 from its rest position, moving conduit 101 in a flux path of this magnetic field toward second pole piece 107. This is the ready position of the printer as illustrated in FIG. 2.

Opening switch 113 collapses the magnetic field which had been produced by closing switch 113. Collapsing the magnetic field releases conduit 101 from being attracted to second pole piece 107. The resilience of the material of which conduit 101 is made causes conduit 101 to spring through the flux path of the now dissolved magnetic field toward the rest position illustrated in FIG. 1. The amount of distortion of conduit 101 due to its attraction to second pole piece 107 is determined to provide sufficient momentum to the print liquid in conduit 101 when conduit 101 impacts anvil 117 to force print liquid out of orifice 131.

Various combinations of tube diameter, tube material, and tube displacement will satisfy the conditions of this invention. For example, a tube having an internal diameter of 0.006 inch with a chamfered orifice ejected a single drop of 0.003 inch diameter when the tube was magnetically displaced 1.5 mm, released and abruptly stopped. The force of impact under the above circumstances was about 500 gravities. Drops produced in this manner are about half the internal diameter of the tube from which they are expelled.

Figure 4:
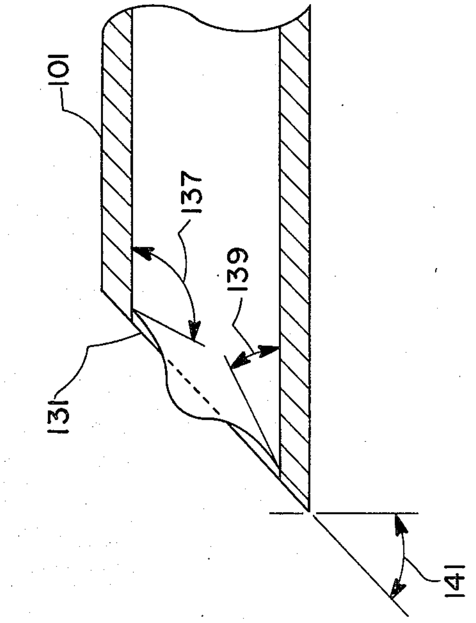
FIG. 4 depicts the interior of the conduit near the orifice showing the contact between the meniscus of the print liquid and the interior of the conduit.

FIG. 4 illustrates the propensity of the print liquid to follow the leading edge of the orifice as it is released. The leading edge guides the print liquid as it flows. Provision of such a guide at the orifice discourages formation of the second tongue of print liquid. Control of the velocity at orifice 131 as conduit 101 strikes anvil 117 regulates the volume of the drop released. The leading edge of angled orifice 131 of conduit 101 also encourages the umbilicus of print liquid to break at the same point during each release. Thus, uniformity of volume and displacement are achieved.

The internal diameter of the tubing which forms print conduit 101 is determined by several factors. Of these factors, the diameter of the drop is crucial. Print quality is fundamentally limited by the diameter of the dot on the page. Traditionally, the diameter of the drop is related to the diameter of the printed dot by the ratio 2:5. Currently, many ink jet printers are built to produce a printed dot of diameter 0.00475 inch. Drop diameter which is closely related to drop volume is influenced by mechanical control of the printer as well as internal diameter of orifice 131. The traditional relationship between internal diameter of the tube, diameter of the drop, and diameter of the printed dot is expressed in the ratio 1:2:5. The preferred embodiment alters this basic relationship. Because a tube of a given internal diameter produces a drop having a diameter equal to half the internal diameter of the tube when used in the preferred embodiment, the new relationship between internal diameter of the tube, diameter of the drop, and diameter of the printed dot becomes 4:2:5. Thus, the preferred embodiment requires use of a tube having a larger internal diameter to produce printed dots of diameter equal to those produced by prior art printers.

This use of a larger diameter tube solves several problems inherent in the use of smaller diameter tubing. First, a larger diameter tube allows passage of dirt that accumulates in the print liquid that would block a smaller diameter tube. Also, a larger diameter tube lessens the effects of water hammer to allow a faster refill time. The larger diameters made possible by the preferred embodiment are still small enough that surface tension and capillary action are controlling factors of the print method. The refill time constant for the tube can be expressed as a differential time constant which models the parameters involved in refilling the tube following a print impulse:

$$\Delta T = \frac{8\eta L}{d\gamma\cos\theta}\,\Delta L,$$

where L is the tube length, ΔL is the amount of fluid emptied by the print impulse, d is diameter of the tube, $\gamma\cos\geqq$ is the working surface tension, and $\eta$ is the fluid viscosity. Tubular conduit 101 uses capillary action to draw print liquid up through the conduit to its orifice 131 which is open to the atmosphere. Conduit 101 serves as an intermediate reservoir for the print liquid. Print liquid is drawn from reservoir 103 for rapid pressure equalization of the pressure reduction caused by the discharge of a drop of print liquid. Due to the surface tension of the print liquid, the print liquid level in conduit 101 is stabilized as print liquid is drawn from reservoir 103.

Viscosity of the print liquid is also a factor in selecting the diameter of conduit 101. A larger diameter tube is required for printing with more viscous fluids. Return of conduit 101 to its ready position after printing tends to force print liquid backwards through the conduit. The back flow is limited by controlling the length and diameter of conduit 101 at its base 133 so that the frictional retarding force of the fluid limits the amount of back flow during drop ejection. Fluid flowing in a laminar manner through a tube of length L at a velocity v experiences a frictional retarding force F given by the following equation:

$$F = 8\pi\eta Lv$$

where $\eta$ is the coefficient of viscosity for the fluid. The length and diameter of conduit 101 should be selected so that there will be low frictional losses in comparison to those offered by the diameter of conduit 101 at base end 133.

While a meniscus is formed at the orifice of conduit 101 when no momentum is applied to the print fluid, surface tension of the print fluid keeps it from dribbling out of orifice 131. The angle at which the meniscus of the fluid contacts conduit 101 is the contact angle. This contact angle is influenced by the composition of conduit 101, the composition of the print fluid, and gravity. More important to the contact angle than any of the preceding factors is the effect of the liquid head in the fluid reservoir. This fluid head tends to pull the liquid back into conduit 101 since the reservoir is at a negative pressure. A height differential, for example, creates a negative head of about two inches of water in the preferred embodiment. In general, the angle between the standing meniscus of the fluid and the inner wall of conduit 101 is the contact angle. Best results from impulse ink jet printers are obtained when the contact angle is in the range from 0° to 15°. The preferred embodiment uses a comparable contact angle.

Figure 5:
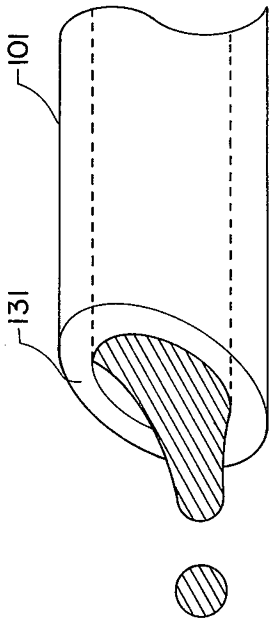
FIG. 5 illustrates the angled orifice of the preferred embodiment which guides a single umbilicus of print fluid from which a single drop is launched.

The angular face of orifice 131 on conduit 101 creates asymmetric contact angles around orifice 131 as illustrated in FIGS. 4 and 5. The angular cut creates a "long" and a "short" side to orifice 131. Surface tension and capillary action pull the liquid up through conduit 101 to the edge of the "long" side of orifice 131. This attempt to pull the fluid to the edge of the "long" side causes the fluid to bulge out of the orifice at the "short" side. Similarly, the surface tension which pulls the fluid to the edge of the "short" side of orifice 131 also pulls the fluid away from the "long" side of orifice 131 causing the fluid to bow inward from the contact points on the "long" side. The asymmetry of contact angles 137 and 139 are apparent on the preferred embodiment which uses an orifice angle 141 of 45°. Also effective are other orifice angles in the range from 30° to 60° deviation from a square cut. The more the orifice angle deviates from a square cut, the more pronounced will be the asymmetry of the contact angles.

Figure 8:
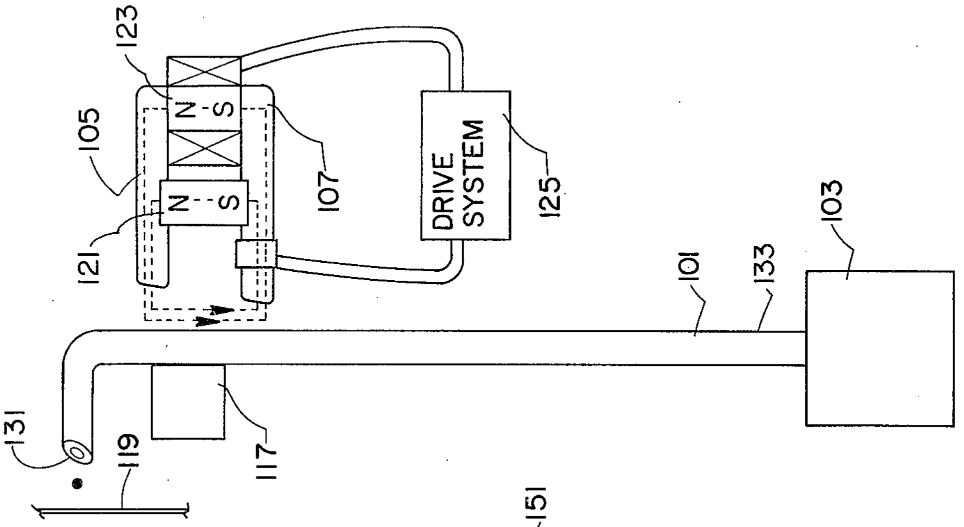
FIG. 8 illustrates the second preferred embodiment of the printer in the impact position which launches a drop of print liquid toward the record member, and illustrates the double magnetic field used to recapture the conduit.
Figure 7:
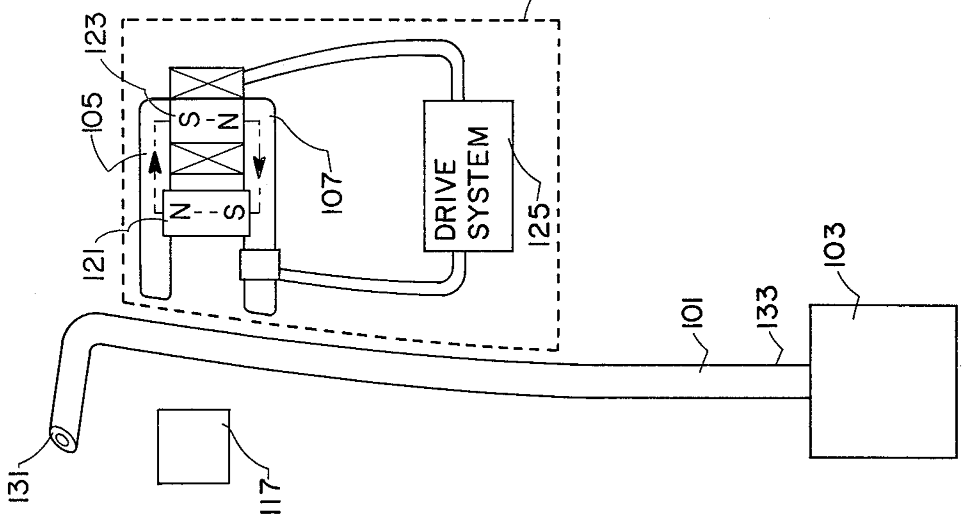
FIG. 7 illustrates the second preferred embodiment of the printer released from the ready position.
Figure 6:
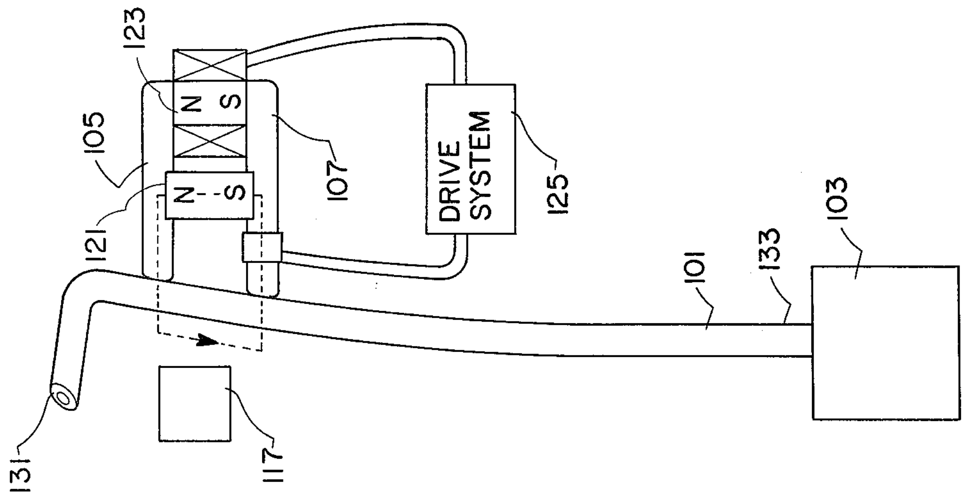
FIG. 6 illustrates the second preferred embodiment of the printer in the ready position.

FIGS. 6, 7, and 8 illustrate a second embodiment using a different prior art actuation means to drive conduit 101. This actuation means employs the two pole pieces 105 and 107 in conjunction with a permanent magnet 121 and an electromagnet 123. Electromagnet 123 is actuated by a drive system 125. Permanent magnet 121 attracts conduit 101, urging conduit 101 into a ready position as illustrated in FIG. 6. Conduit 101 is held in this ready position when drive system 125 is off.

Drive system 125 is used to create a magnetic field of polarity opposite to that of permanent magnet 121, FIG. 7. Depending on the strength of the opposing field, magnetic conduit 101 is either allowed to escape from the ready position where the opposing magnetic field is used to overcome the field of permanent magnet 121, or magnetic conduit 101 is repelled away from the pair of magnets where conduit 101 carries a magnetic charge and the opposing field dominates the magnetic field of permanent magnet 121. Where conduit 101 is repelled rather than simply released from the first magnetic field, the print speed of the printer is increased. The first embodiment which uses only an electromagnet requires a pause in the actuation cycle to prevent the magnetic metal on conduit 101 from overheating and to allow the collapsed magnetic field to dissipate. By contrast, the second embodiment merely reverses polarities of the magnetic fields in response to signals from drive system 125, achieving instant dissipation of the first magnetic field by application of the second magnetic field.

We claim:

1. An apparatus for performing ink jet printing comprising:

conduit means coupled to a fluid reservoir and having an orifice at an unaffixed end thereof for discharging a preselected drop of fluid from said orifice in response to interruption of the travel of said conduit means;

actuator means for causing the conduit means to travel along a preselected path in response to a first electrical signal;

and means for interrupting the travel of said conduit.

2. An apparatus as in claim 1 wherein the orifice of said conduit means is oblique to the run of the conduit means adjacent to the orifice creating a leading edge on said orifice, said leading edge attracting the print liquid which is forced out of the orifice means in response to interruption of the travel of said conduit means.

3. An apparatus as in claim 2 wherein the actuator means comprises:

means disposed to present a preselected magnetic field in the proximity of said conduit means in response to a first electrical signal; and the conduit means includes magnetic material disposed to be influenced by the magnetic field.

4. A method of ink jet printing using a small cross-sectional area conduit containing print liquid having an orifice end for ejecting drops of print liquid and having a resting position and a ready position, said method comprising the steps of:

selectively urging the orifice end of said conduit to be displaced a predetermined distance from the resting position;

selectively allowing the conduit to travel from the ready position along a path; and abruptly interrupting the travel of the conduit creating forward momentum in the print liquid in the orifice end of the conduit to force expulsion of a drop of print liquid from the orifice.

5. A method as in claim 4 wherein the step of selectively urging the conduit comprises the additional steps of:

establishing a magnetic field; and attracting the resilient conduit having magnetic material into a ready position within a selected flux path of the magnetic field by the magnetic field.

6. A method of ink jet printing using a small cross-sectional area conduit containing print liquid and having a resting position and a ready position, said method comprising the steps of:

urging the orifice end of the conduit to be displaced a predetermined distance from the resting position to the ready position;

allowing the conduit to travel from the ready position along a path;

abruptly interrupting the travel of the conduit creating forward momentum in the print liquid in the orifice end of the conduit; and forcing expulsion of a drop of print liquid from the orifice, thereby providing a drop having a diameter whose ratio to the internal diameter of the conduit is less than 2:1.

* * * * *

UNITED STATES PATENT AND TRADEMARK OFFICE

CERTIFICATE OF CORRECTION

PATENT NO. : 4,336,544

DATED : June 22, 1982

INVENTOR(S) : David K. Donald, et al.

It is certified that error appears in the above-identified patent and that said Letters Patent are hereby corrected as shown below:

Column 4, line 14, "$\gamma\cos\geq$" should read --$\gamma\cos\theta$-- .

Signed and Sealed this

Sixteenth Day of November 1982

[SEAL]

*Attest:*

GERALD J. MOSSINGHOFF

*Attesting Officer* *Commissioner of Patents and Trademarks*